Oct. 27, 1925.

C. E. HENKE 1,558,805

MILK STRAINER AND COOLER

Filed March 18, 1921    2 Sheets-Sheet 1

INVENTOR:
Carl E. Henke
BY Adam E Fisher
ATTORNEY.

Patented Oct. 27, 1925.

1,558,805

UNITED STATES PATENT OFFICE.

CARL E. HENKE, OF HUTCHINSON, MINNESOTA.

MILK STRAINER AND COOLER.

Application filed March 18, 1921. Serial No. 453,250.

*To all whom it may concern:*

Be it known that I, CARL E. HENKE, a citizen of the United States, residing in the city of Hutchinson and State of Minnesota, have invented new and useful Improvements in Milk Strainers and Coolers, of which the following is a specification, reference being had to the accompanying drawings.

This invention relates to milk strainers and coolers, and the object is to provide a combination milk strainer and cooler, which may be readily set in position on any milk can, and wherein means are embodied for automatically indicating when the milk can is full.

Figure 1:
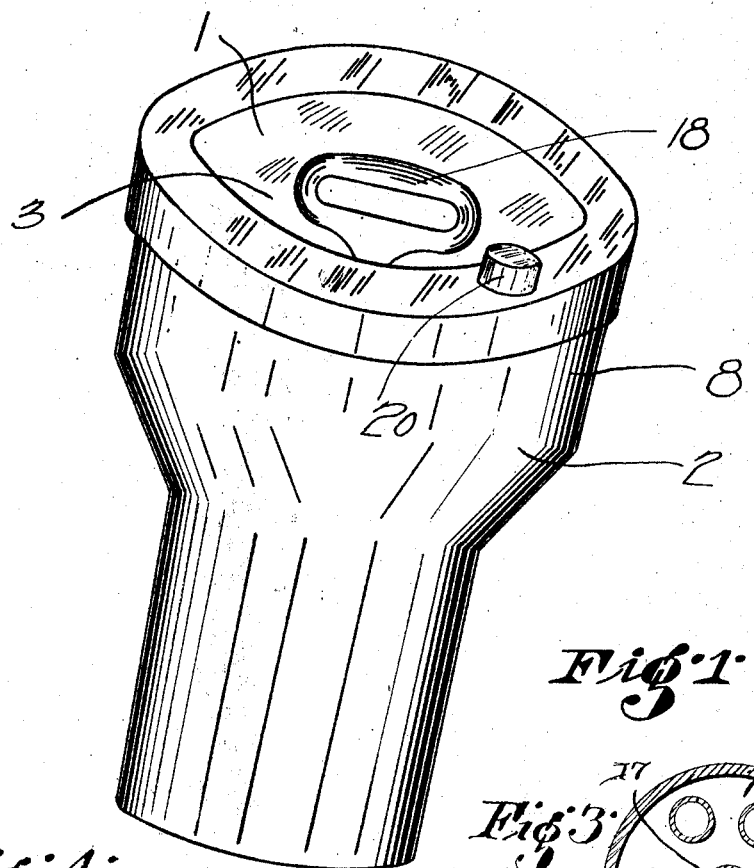
Figure 1 is a perspective view of the strainer.
Figure 3:
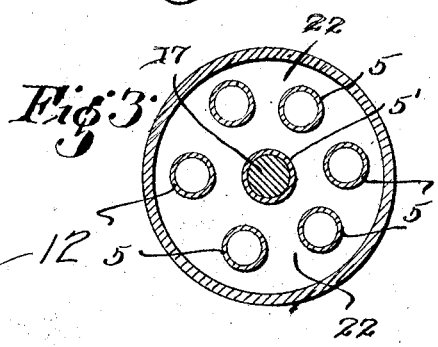
Figure 3 is a horizontal section midway between the ledge 6 and the annular recess 10, in Figure 2.
Figure 4:
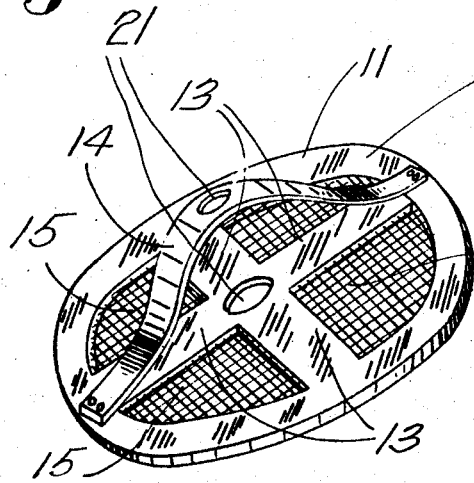
Figure 4 is a detail of the strainer element.
Figure 2:
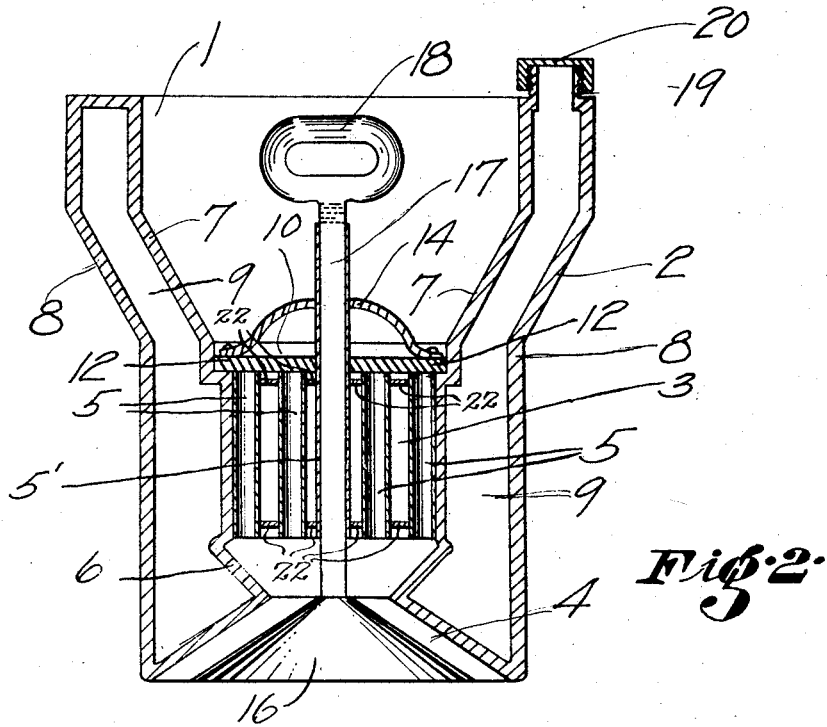
Figure 2 is a vertical section.
Figure 5:
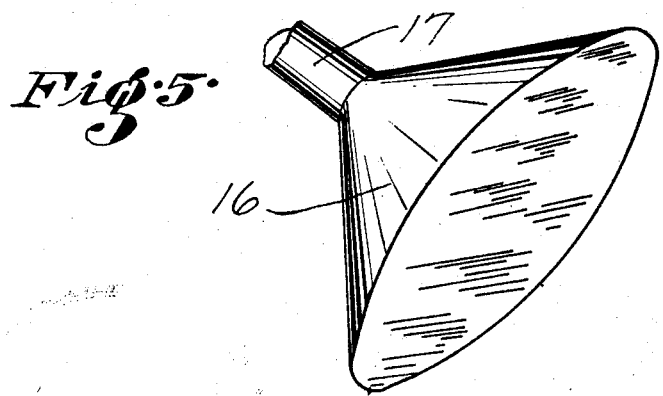
Figure 5 is a detail of the float.

The invention consists in providing a water cooled passage way or funnel through which the milk passes into the container, in combination with a float adapted to be raised by the milk in the container to indicate when the latter is full.

As exemplified in the drawings, the invention consists in a circular, double walled structure 1, the upper part of which takes the form of a funnel 2 leading to a central well 3, and ending in an inverted funnel 4. A plurality of open tubes 5 are vertically extended to afford a passage way for the milk, the said tubes to be supported at each end by webs 22 which completely fill all intervening space, and one of said tubes as 5 being positioned at the exact center. Immediately below these tubes the inner wall of the structure contracts inwardly to form a ledge 6 upon which the milk may fall and thus quicken the cooling. Thus the inner and outer walls 7 and 8 form an interior water-way 9. At the point of juncture of the upper funnel 2 with the well 3, an annular recess 10 is formed. A strainer 11 is provided, made up of a flat band or ring 12 carrying the cross strips 13, handle 14, and covered with fine wire netting 15. A central hole 21 is cut through the strainer. The ring 12 fits snugly within the recess 10. An air tight float 16 is provided, same resembling an inverted funnel in exterior appearance, and a rod 17 extends from the point of this float upwardly through the central tube 5' and the hole 21 in the strainer. The upper end of the rod 17 is threaded to engage a thread cut in the handle 18. A threaded port 19 in the upper edge of the funnel 2 provides means for filling the device with water and a threaded cap 20 is adapted to close this port.

In use, the apparatus is filled with cold water and it is then set in the top of milk container. As the milk is poured through, it is cooled by passing over the water cooled surfaces, and through the small tubes and over the ledge below the said tubes. As the milk rises in the container, the float and handle are raised, thus indicating when the container is filled.

While I have herein described a certain specific method of constructing and assembling the elements of my invention, it is understood same may be varied in minor details, not departing from the spirit of my invention as defined in the appended claim.

I claim:

A milk strainer and cooler for filling containers, comprising in combination a double walled funnel-like structure having a filling port, the inner wall thereof, near the lower end, being contracted inwardly to form a ledge upon which the milk may fall, the said inner wall being then flared outwardly to meet the outer wall, and there being an annular recess formed medially of the inner wall; a circular strainer adapted to releasably engage the said annular recess of the inner wall; a float adapted to enter the container, and having an indicator rod slidingly extended up through the apparatus.

CARL E. HENKE.